(12) United States Patent
Dreibholz et al.

(10) Patent No.: US 7,645,209 B2
(45) Date of Patent: Jan. 12, 2010

(54) METHOD FOR OPERATING A PARALLEL HYBRID POWERTRAIN

(75) Inventors: Ralf Dreibholz, Meckenbeuren (DE); Johannes Kaltenbach, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 487 days.

(21) Appl. No.: 11/788,326

(22) Filed: Apr. 19, 2007

(65) Prior Publication Data

US 2007/0246275 A1  Oct. 25, 2007

(30) Foreign Application Priority Data

Apr. 19, 2006  (DE) ................ 10 2006 018 059

(51) Int. Cl.
*B60W 10/08* (2006.01)
(52) U.S. Cl. .................................................. 477/5
(58) Field of Classification Search ............ 477/3, 477/5
See application file for complete search history.

(56) References Cited

U.S. PATENT DOCUMENTS

| | | | |
|---|---|---|---|
| 6,336,889 B1 * | 1/2002 | Oba et al. ............... | 477/5 |
| 6,342,027 B1 * | 1/2002 | Suzuki ................... | 477/5 |
| 6,510,370 B1 | 1/2003 | Suzuki et al. | |
| 7,347,803 B2 * | 3/2008 | Kobayashi et al. ...... | 477/5 |
| 7,360,616 B2 * | 4/2008 | Schiele .................. | 180/65.265 |
| 7,472,769 B2 * | 1/2009 | Yamanaka et al. ....... | 180/65.25 |
| 2002/0117339 A1 | 8/2002 | Nakashima | |
| 2005/0153815 A1 | 7/2005 | Janssen | |
| 2006/0266568 A1 | 11/2006 | Barske | |
| 2007/0207892 A1 * | 9/2007 | Dreibholz et al. ....... | 477/8 |
| 2009/0098977 A1 * | 4/2009 | Kaltenbach .............. | 477/5 |

FOREIGN PATENT DOCUMENTS

DE    195 49 081 A1    7/1997

(Continued)

*Primary Examiner*—Dirk Wright
(74) *Attorney, Agent, or Firm*—Davis & Bujold, P.L.L.C.

(57) ABSTRACT

A method for operating a parallel hybrid powertrain (1) of a motor vehicle with multiple drive units (2, 3) and with a single output side (5) is described. At least one internal combustion engine (2) and one electric motor (3) are provided and the at least one electric motor (3) is arranged in the powertrain between the output (5) and the at least one internal combustion engine (2). A first friction-locking shifting element (7) is provided between the internal combustion engine (2) and the electric motor (3), while a coupling element (8A) with rotational speed dependent recognition and at least one second friction-locking shifting element (30) are arranged between the electric motor (3) and the output side (5). A target output torque to be applied at the output (5) is a function of the power transmission capacity of the second shifting element (30). The power transmission capacity of the second shifting element (30) is controlled as a function of the required target output torque (m_fahr_soll) so that the second shifting element (30) has the power transmission capacity required for achieving the target output torque (m_fahr_soll) at the output (5). A target slip specification (s_30_soll) of the second shifting element (30) is controlled at least as a function of the target-drive torque by means of the target drive torque (m_2_soll, m_3_soll) to be produced and are converted with a closed loop control as a function of a further operating state parameter of the parallel hybrid powertrain by the drive units (2, 3).

20 Claims, 9 Drawing Sheets

FOREIGN PATENT DOCUMENTS

| | | |
|---|---|---|
| DE | 100 26 332 A1 | 7/2001 |
| DE | 100 23 053 | 12/2001 |
| DE | 100 65 760 A1 | 7/2002 |
| DE | 102 06 940 A1 | 2/2003 |
| DE | 101 58 536 | 7/2003 |
| DE | 102 34 428 A1 | 2/2004 |
| DE | 103 27 306 A1 | 1/2005 |
| DE | 103 53 256 B3 | 3/2005 |
| DE | 10 2004 002 061 | 8/2005 |
| DE | 10 2004 016 846 | 10/2005 |
| JP | 2000-145046 A | 5/2000 |
| WO | WO 98/40647 | 9/1998 |

* cited by examiner

METHOD FOR OPERATING A PARALLEL HYBRID POWERTRAIN

This application claims priority from German Application Serial No. 10 2006 018 059.3 filed Apr. 19, 2006.

FIELD OF THE INVENTION

The invention relates to a method for operating a parallel hybrid powertrain

BACKGROUND OF THE INVENTION

Hybrid vehicles with parallel hybrid powertrains of the state of the art usually feature, arranged between an internal combustion engine and the output drive of the vehicle, a starting element in the form of a friction clutch in order to start the vehicles with the internal combustion engine in a commonly known manner, wherein the starting element is first operated in a slip mode during the starting procedure. With the hybrid vehicle featuring only a starting procedure using the onboard electric motor, the open loop and closed loop controlled slip mode operation of the starting element is not necessary, because, in contrast to conventional internal combustion engines, the electric motor does not have a minimum rotational speed.

A method is described in DE 10 2004 02 061 for controlling an open loop and closed loop of a powertrain of a hybrid vehicle and a powertrain of a hybrid vehicle equipped with a friction-locking starting element. With this inventive method for open loop and closed loop control of a powertrain of a hybrid vehicle with a internal combustion engine, an electric motor, a shifting element, arranged between the electric motor and an output within a power flow of the powertrain and designed with continuously variable transmission capacity, and a clutch arrangement arranged between the electric motor and the internal combustion engine, via which the electric motor and the internal combustion engine can be functionally connected, a powertrain of a hybrid vehicle can be operated in such a way that switching over from driving the hybrid vehicle by means of the electric motor to a parallel drive mode of the hybrid vehicle facilitated by the electric motor and the internal combustion engine or to driving the hybrid vehicle solely by means of the internal combustion engine as well as starting the internal combustion engine through the electric motor can be performed without any noticeable powertrain reaction torque detectable to the hybrid vehicle driver.

When this powertrain operates, the power transmission capacity of the shifting element is adjusted during a startup procedure in such a manner that a torque is present, which is independent of the startup procedure of the internal combustion engine at the output of the powertrain, where changes in torque at the output appearing as a result of the starting internal combustion engine are prevented preferably through a slip mode operation of the shifting element.

In this method, the rotational speed of the electric motor during the start of the internal combustion engine is increased to a rotational speed value, wherein it is ensured that the shifting element between the electric motor and the output of the powertrain is held in a slip mode operation during the entire internal combustion engine startup procedure. The rotational speed value is calculated via an algorithm implemented in the engine control, the transmission control and/or a subordinate memory manager.

The prior art also includes vehicles with internal combustion engines featuring their own minimum rotational speed, where the engines are provided with a starting element in the form of a hydrodynamic torque converter to allow the vehicle to be started by the internal combustion engine.

It is the object of invention to present a method for operating a parallel hybrid powertrain of a vehicle that is executed in the area between the electric motor and the output with a hydrodynamic torque converter and at least one additional friction-locking shifting element, the application of which allows a parallel hybrid powertrain to be operated over its entire operating range in a scope that ensures a high degree of driving comfort.

SUMMARY OF THE INVENTION

In the inventive method for operating a parallel hybrid powertrain of a vehicle with multiple drive systems and with a single output, and having at least one internal combustion engine and an electric motor, at least one electric motor is arranged in the powertrain between the output and the at least one internal combustion engine, a first friction-locking shifting element between the internal combustion engine and the electric motor, a clutch element with a rotational speed dependent characteristic value is arranged between the electric motor and the output, and is preferably a hydrodynamic torque converter, a hydrodynamic clutch or a centrifugal clutch, and at least one second friction-locking shifting element. A target output side torque to be applied at the output is a function of the power transmission capacity of the additional shifting element. The power transmission capacity of the second shifting element is controlled as a function of the required target-output torque, so that the second shifting element has the power transmission capacity required for achieving the target output torque at the output. A target slip specification of the second shifting element is, by means of the target drive torque to be produced by the drive units, controlled at least as a function of the target drive torque and controllably converted as a function of a further operating state parameter of the parallel hybrid powertrain.

It is therefore possible by simple means to keep the second shifting element of the parallel hybrid powertrain in a controlled slip operation when driving and this is facilitated exclusively by the electric motor as well as when the internal combustion engine is subsequently started by the electric motor for the purpose of attenuating fluctuations in torque caused by activating the internal combustion engine in relation to the second shifting element on the side of the internal combustion engine of the parallel hybrid powertrain in the area of the slipping second shifting element and also for the purpose of preventing changes in the output torque present at the output and generated through the startup of the internal combustion engine.

It is furthermore also possible, during a hybrid driving mode in which the vehicle is simultaneously driven by the internal combustion engine and the electric motor, to remain in a controlled slip operation for the purpose of preventing arising fluctuations in torque in the internal combustion engine portion of the parallel hybrid powertrain. These fluctuations increase under certain circumstances in the area of the clutch element, especially when the clutch element is a hydrodynamic torque converter, owing to the torque conversion, and are further guided in the direction of the output thereby decreasing driving comfort.

The inventive approach allows the internal combustion engine to be started by the electric motor in a simple manner by varying the power transmission capacity of the first shifting element without producing a reaction torque that can be detected by the driver, while the power transmission capacity of the second shifting element is controllably adjusted and while the target slippage of the second shifting element is controllably adjusted with the help of the electric motor or both the electric motor and the internal combustion engine, via the clutch element.

The inventive approach furthermore allows slippage of the second shifting element to be adjusted toward a required minimum, both during an internal combustion engine startup and during a hybrid driving operation, for the purpose of reducing frictional stress. Such a slippage minimum for the second shifting element is derived, for example, from a minimum starting rotational speed required for an internal combustion engine startup, from which a minimum differential rotational speed between the drive rotational speed of the electric motor and starting rotational speed of the transmission is generated.

This minimal differential rotational speed can be realized in an advantageous manner essentially in the area of the clutch element, in the area from which appearing power losses are more easily discharged than in the area of the second shifting element, where this is of special significance at low vehicle speeds and when the vehicle has come to a stop.

If the clutch element can be bridged via a torque converter lockup clutch arranged parallel within the parallel hybrid powertrain, whose power transmission capacity is continuously adjustable, it is provided in a further advantageous variant of the inventive method that the portion of the target drive torque to be generated by the drive units and which is to be guided via the torque converter lockup clutch, is adjusted in a way that the rotational speed-dependent influence of the clutch element is reduced, and fluctuations in torque appearing in the internal combustion engine portion of the parallel hybrid powertrain in relation to the clutch element are further guided toward the second shifting element with minor intensification.

BRIEF DESCRIPTION OF THE DRAWINGS

Additional advantages and advantageous embodiments of the invention are described with reference to the attached drawings, wherein, for the sake of clarity, the same reference numerals are used to identify elements that fulfill the same function in the description of the different embodiments. In the drawings.

DETAILED DESCRIPTION OF THE DRAWINGS

Figure 1:
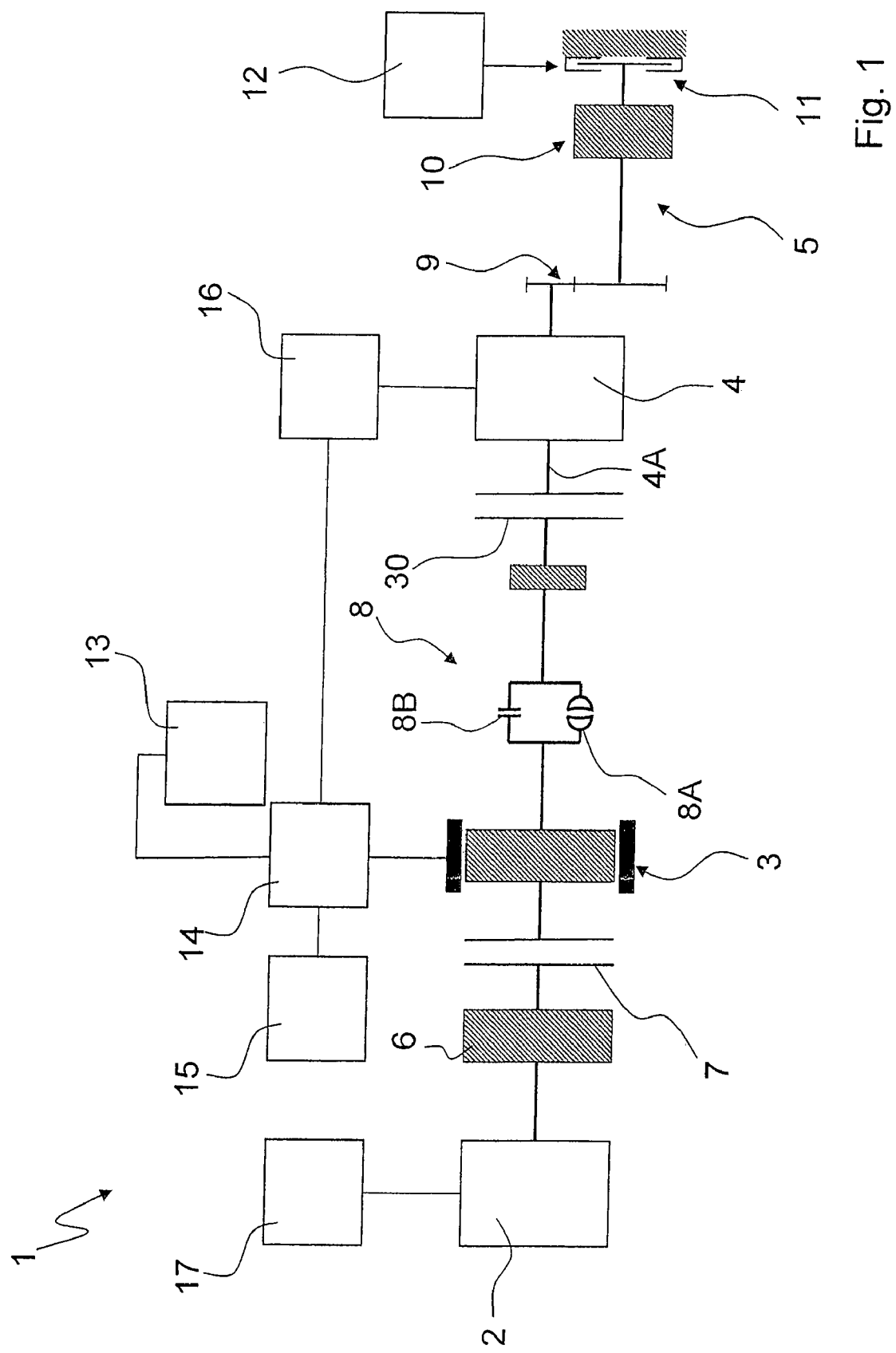
FIG. 1 shows a highly schematic illustration of a parallel hybrid powertrain with a torque converter, a torque converter lockup clutch arranged parallel thereto in the parallel hybrid powertrain and a second shifting element provided between the torque converter and a transmission input.

In FIG. 1 is shown a parallel hybrid powertrain 1 of a hybrid vehicle as a highly schematic illustration in the form of a block diagram. The parallel hybrid powertrain 1 comprises an internal combustion engine 2, an electric motor 3, a transmission 4, and an output 5. Arranged between the internal combustion engine 2 and the electric motor 3 is a device 6 for reducing rotational irregularities as well as a first friction-locking shifting element 7.

A functional connection between the internal combustion engine 2 and the electric motor 3 can be created by means of a shifting element 7 for the purpose of allowing different operating states of the parallel hybrid powertrain 1 of the motor vehicle, such as a driving mode facilitated only by the electric motor 3, a parallel driving mode facilitated by both the internal combustion engine 2 and the electric motor 3, or a driving mode facilitated only by the internal combustion engine 2.

Furthermore, arranging the first shifting element 7 between the internal combustion engine 2 and the electric motor 3 makes possible a coupling of the internal combustion engine to the electric motor 3 via the first shifting element 7 once the necessary rotational energy of the electric motor 3 for an internal combustion engine startup is available, so that the internal combustion engine 2 is started by the electric motor 3.

A starting element 8, comprising first, a torque converter 8A being a TriLok converter and a torque converter lockup clutch 8B arranged parallel thereto in the parallel hybrid powertrain 1, and second, having a continuously variable power transmission capacity, via which the electric motor 3 is functionally connected to the transmission 4 and the output 5 is furthermore provided between the electric motor 3 and the transmission 4, which is arranged on the side of the electric motor 3 facing away from the internal combustion engine 2. The transmission 4 is presented herein as a conventional automatic transmission via which different gear ratios can be realized, as such the transmission can be any transmission known from the practice.

A second friction-locking shifting element 30 with continuously variable power transmission capacity, has one clutch half connected to the transmission-side output of the starting element 8 and the other clutch half is connected to a transmission input shaft 4A of the transmission 4, so that the power flow of the parallel hybrid powertrain 1 in the area of the second shifting element 30 can be influenced as a function of the power transmission capacity of the second shifting element, is furthermore provided between the starting element 8 and the transmission 4.

Deviating from the design of the parallel hybrid powertrain 1 schematically illustrated in FIG. 1, the second shifting element can also be a clutch or motion control device integrated into the transmission, which is connected within the power flow of the parallel hybrid powertrain to realize a starting gear ratio of the transmission.

On the side facing away from the second shifting element 30 or the transmission output, the transmission 4 is functionally connected via an axle differential 9 to wheels 10 of a vehicle drive axle of the parallel hybrid powertrain 1. A portion of the brake system 11, which is represented with a brake booster 12, is illustrated among the wheels 10. The brake booster 12 represents a device by means of which the brake system is automatically actuated in motor braking of the parallel hybrid powertrain for realizing a reverse torque on the output 5, if an electrical accumulator 13 subordinate to the electric motor 3 is fully charged by the generator-driven electric motor 3 and no sufficient engine braking torque can be realized by the electric motor at the output side 5. The electrical accumulator 13 is connected via an electrical control unit 14 to the electric motor 3, a vehicle electrical system 15, and an electrical transmission control unit 16, where the latter transmission control unit 16 is provided for controlling the transmission 4. An engine control unit 17 is provided for controlling the internal combustion engine 2.

The second shifting element 30 can be transferred into slip operation by changing the power transmission capacity and/or by changing the rotational speed of the electric motor 3, while the target-drive torque m_fahr_soll is present at the output 5.

Figure 2:
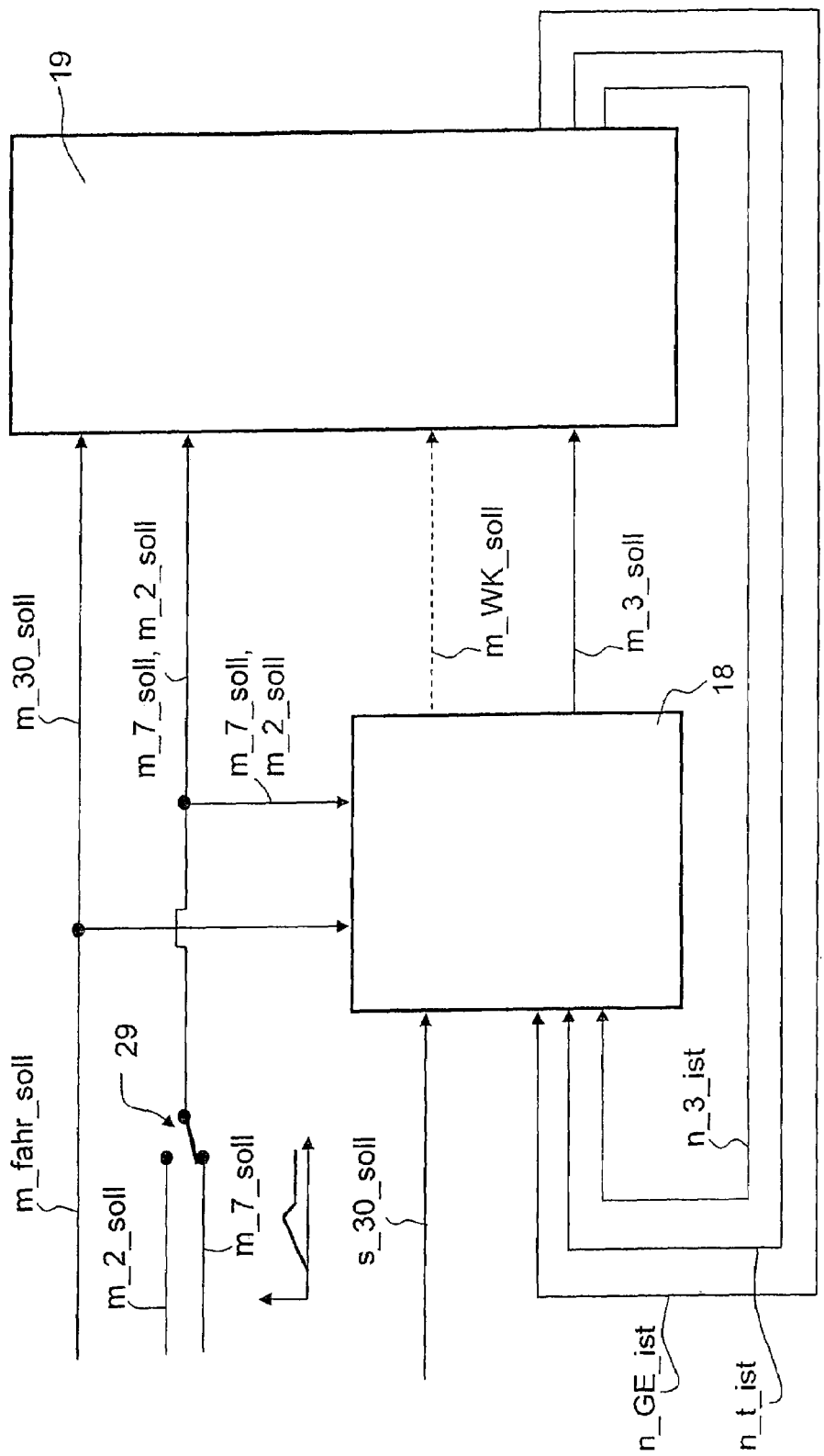
FIG. 2 shows a block diagram of a rotational speed control structure for open loop and closed loop control of a target drive torque of the drive units of the parallel hybrid powertrain as shown in FIG. 1 when driving is powered by the electric motor and when the internal combustion engine is started by the electric motor.

FIG. 2 shows a rotational speed control structure, by means of which the parallel hybrid powertrain 1 can be inventively operated as illustrated in FIG. 1, while the hybrid vehicle is being driven or started solely by the electric motor and the subsequent internal combustion engine 2 startup facilitated by the electric motor can also be operated, without causing a reaction torque that detracts from the driving comfort at the output.

When the internal combustion engine is released, a driver-requested starting torque and/or a target-drive torque m_fahr_soll to be applied at the output side 5 can be initially realized only via the electric motor 3 at the output side 5 as a function of the current operating state of the starting element 8 and the currently set transmission capacity of the second shifting element 30.

The driver-requested target drive torque m_fahr_soll represents, along with a measured actual driving rotational speed n_3_ist of the electric motor 3, that is, the electric motor input rotational speed of the starting element 8, an actual turbine rotational speed n_t_ist of the torque converter 8A that corresponds to an output rotational speed of the starting element 8 of the parallel hybrid powertrain 1 as shown in FIG. 1 as well as an input rotational speed of the second shifting element 30 and an actual transmission input rotational speed n_GE_ist of the transmission 4, which corresponds to a transmission output rotational speed of the clutch half of the second shifting element 30 connected to the transmission 4, an input value of an open loop and closed loop control device 18 of the torque control structure illustrated in FIG. 2.

Furthermore, the target transmission capacity m_7_soll of the first shifting element 7 and/or the target torque m_7_soll to be guided via the first shifting element 7, represent a control variable and a disturbing moment of the rotational speed control structure illustrated in FIG. 2 during the startup of an internal combustion engine 2 in order to facilitate the activation and starting of the internal combustion engine 2 when a request to connect the internal combustion engine 2 to the electric motor 3 without a reaction torque at the output is present.

After the internal combustion engine 2 is started, a switch 29 in the rotational speed control structure, schematically illustrated in FIG. 2, is thrown and the target drive torque m_2_soll of the internal combustion engine 2 is fed as a negative value to the process to be controlled or as a control variable to the parallel hybrid powertrain 1, where the target-drive torque m_2_soll of the internal combustion engine 2 also represents a disturbing moment of the rotational speed control structure schematically illustrated in FIG. 2.

The target drive torque m_3_soll to be generated by the electric motor 3 during a driving operation powered solely by the electric motor or during the startup of an internal combustion engine 2 facilitated by the electric motor is thus determined as a function of the load torques appearing in the parallel hybrid powertrain, which represent the disturbance variables in the control.

In addition, the target specification m_7_soll of the power transmission capacity of the first shifting element 7 is fed as a control variable to the real process 19, that is, to the vehicle or parallel hybrid powertrain 1, so that the first shifting element 7 can be presented with the required power transmission capacity over the entire operating range of the driving operation of the parallel hybrid powertrain 1 powered solely by the electric motor as well as during the startup of an internal combustion engine 2.

At the same time, the real process 19 or the second shifting element 30 is controlled within this same scope, so that the second shifting element 30 is available with a power transmission capacity m_30_soll required for achieving the target output torque m_fahr_soll requested by the driver. The second shifting element 30 features an operating state in which a torque can be transmitted via the second shifting element 30, while said torque is required at the output side 5 in order to realize the requested target output torque m_fahr_soll. Furthermore, the open loop and closed loop control device 18 is fed a target slippage specification s_30_soll for the second shifting element 30 as an input variable for the purpose of operating the second shifting element 30 in a slip operation required for a desired level of driving comfort.

Figure 3:
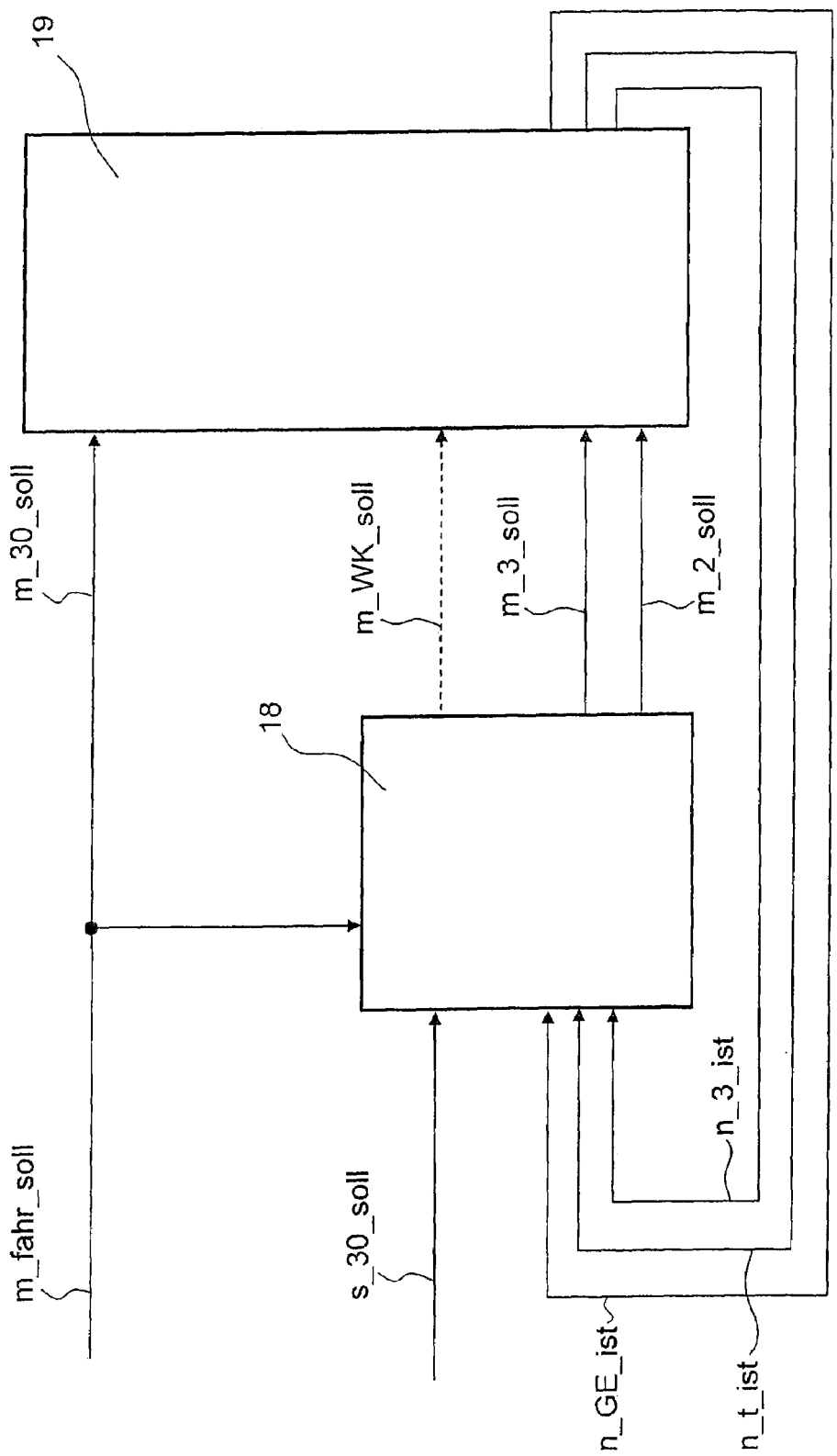
FIG. 3 shows a block diagram of a torque control structure for open loop and closed loop control of the target drive torque of the drive units of the parallel hybrid powertrain shown in FIG. 1 during a hybrid driving operation.

FIG. 3 is a highly schematic block circuit diagram representing the inventive method for adjusting a target output torque m_fahr_soll requested by the driver during a hybrid driving operation of the parallel hybrid powertrain 1 as illustrated in FIG. 1. The target output torque m_fahr_soll requested by the driver represents, in addition to the measured actual drive rotational speed n_3_ist of the electric motor 3, the actual turbine rotational speed n_t_ist of the torque converter 8A, the actual transmission input rotational speed n_GE_ist, and the target slippage specification s_30_soll, an input value of the open loop and closed loop control device 18 of the rotational speed control structure illustrated in FIG. 3, by means of which the respective specifications for a target-drive torque m_2_soll of the internal combustion engine 2, the target drive torque m_3_soll of the electric motor 3, and the target power transmission capacity m_WK_soll of the torque converter lockup clutch 8B are ascertained. The target drive torques m_2_soll and m_3_soll of the internal combustion engine 2 and the electric motor 3 as well as the target-power transmission capacity m_WK_soll of the torque converter lockup clutch 8B represent output values of the open loop and closed loop control device 18, which are fed as operating parameters to the system "vehicle" or the real process 19.

The target power transmission capacity m_30_soll of the second shifting element 30 is fed directly as control variable to the real process 19 as a function of the requested target output torque m_fahr_soll, which is to be presented at the output side 5. Because the first shifting element 7 is completely engaged during a hybrid driving operation, the target power transmission capacity m_7_soll of the first shifting element 7 or the target drive torque m_2_soll of the combustion engine 2 is not factored into the control of the target drive torque m_2_soll of the internal combustion engine 2 and/or the target drive torque m_3_soll of the electric motor 3 as well as the rotational speed control structure illustrated in FIG. 3.

Figure 4:
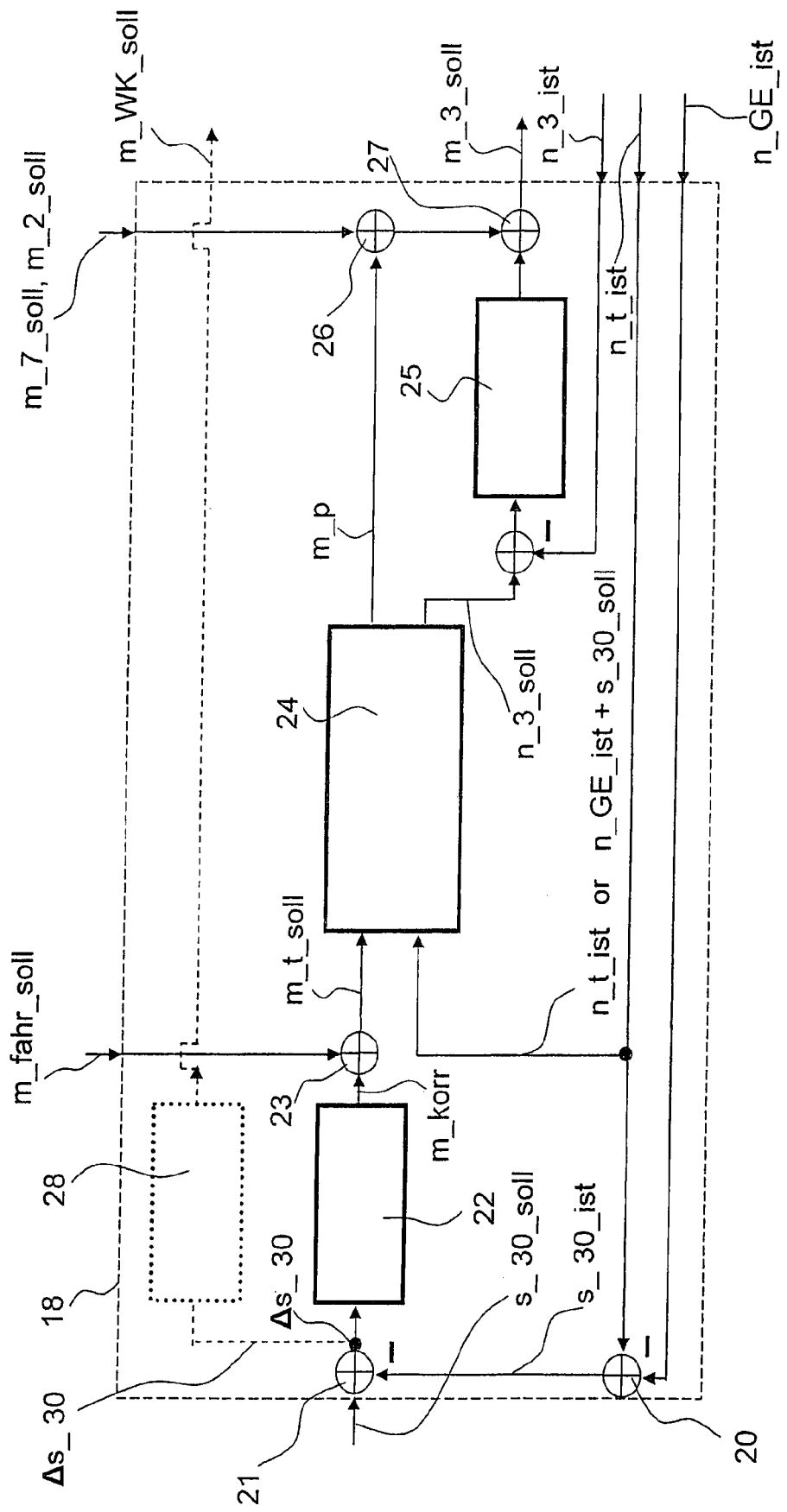
FIG. 4 shows a detailed block diagram of an open loop and closed loop control device of the torque control structure shown in FIG. 2.

FIG. 4 is a detailed block circuit diagram representing a first embodiment of the open loop and closed loop control device 18 of the rotational speed control structure illustrated in FIG. 2. In a first crosspoint 20, an actual-slippage s_30_ist of the second shifting element 30 is ascertained between the target turbine rotational speed n_t_ist and the actual transmission input rotational speed n_GE_ist. A control deviation Δs_30 is ascertained between the target slippage specification s_30_soll and the actual slippage s_30_ist of the second shifting element 30 in a second crosspoint 21 and fed to a first control device 22 to determine a correction torque m_korr for the target output torque m_fahr_soll, where the correction torque m_korr is added to the requested target output torque m_fahr_soll in a third crosspoint 23.

The sum of the target drive torque m_fahr_soll and the correction torque m_korr represents a target turbine torque m_t_soll, which is fed to a function block 24 of the open loop and closed loop control device 18. By means of the function block 24, a pump torque m_p of the torque converter 8A as well as a target drive rotational speed n_3_soll of the electric motor or an electric input rotational speed of the starter element 8 provided by the motor is determined as a function of an inverse converter characteristic value. A control deviation is determined between the target drive rotational speed n_3_soll of the electric motor 3 calculated in the function block 24 and the measured actual drive rotational speed n_3_ist of the electric motor 3, which is fed to a second control device 25 that can be designed as a proportional integral control or as PID-controller, whose output value represents a control portion of the target drive torque m_3_soll of the electric motor.

In a fourth crosspoint 26, the pump torque m_p ascertained via the function block 24 is added to the target power transmission capacity m_7_soll of the first shifting element 7 or, when the internal combustion engine is activated, to the target drive torque m_2_soll of the internal combustion engine 2, where the sum represents a control portion of the target drive torque m_3_soll of the electric motor 3.

The process of selecting whether the target drive torque m_2_soll of the internal combustion engine 2 or the target power transmission capacity m_7_soll of the first shifting element 7, is to be added to the ascertained pump torque m_p is performed via the switch 29. The respective prevailing disturbing variable moment is thus incorporated into the process of determining the target drive torque m_3_soll of the electric motor 3 during the start of an internal combustion engine 2.

In a fifth crosspoint 27, the sum calculated in the fourth crosspoint 26 is added to the control portion of the target drive torque n_3_soll of the electric motor 3 ascertained via the second control device 25, where the sum calculated in the fifth crosspoint 27 represents the target drive torque m_3_soll of the electric motor 3 to be outputted to the real process 19.

Both the pump torque m_p as well as the target drive rotational speed n_3_soll of the electric motor 3 are ascertained along with the target turbine torque m_t_soll also as a function of the actual-turbine rotational speed n_t_ist or an equivalent rotational speed variable of the parallel hybrid powertrain 1, which represents an input value of the function block 24. The rotational speed variable equivalent to the actual turbine rotational speed n_t_ist can be ascertained, for example, from the target slippage specification n_30_soll of the second shifting element 30 and the actual transmission input rotational speed n_GE_ist of the transmission 4 and fed to the function block 24 as input variable.

When there a request for the activation of the internal combustion engine 2, which can occur due to an excessively low charge in the electrical accumulator 13, a rotational speed requirement of the electric motor 3, a vehicle speed requirement and/or a torque requirement requested by the driver, the target drive torque m_3_soll to be generated by the electric motor 3 of the parallel hybrid powertrain 1 illustrated in FIG. 1, is specified and/or adjusted via an open loop and closed loop control device 18 illustrated in FIG. 4 in an open loop and closed loop control.

Startup and starting procedures can be differentiated herein from one another, in which the torque converter lockup clutch 8B is completely released or at least a partial bridging of the hydrodynamic torque converter 8A is triggered. The parallel hybrid powertrain 1 illustrated in FIG. 1 is operated in the previously described manner during startup and starting procedures, in which the torque converter lockup clutch 8B is completely released.

As an alternative, during startup and starting procedures as well as during driving operations powered by the electric motor, during which the torque converter lockup clutch 8B is available with power transmission capacity, where torque can be guided by this component, the parallel hybrid powertrain illustrated in FIG. 1 is thereby operated with an open loop and closed loop control, wherein the control deviation Δs_30 of the slippage of the second shifting element 30 is fed to a third control device 28. The target power transmission capacity m_WK_soll of the torque converter lockup clutch 8B is determined in the third control device 28.

The target power transmission capacity m_WK_soll is adjusted so that a slippage is reduced in the torque converter 8A and the hydrodynamic influence of the torque converter 8A on a completely released torque converter lockup clutch 8B is reduced. This means that the portion of the target drive torque m_3_soll of the electric motor 3 to be guided via the torque converter lockup clutch 8B is determined by the third control device 28.

Illustrated in FIG. 4, the first embodiment of the open loop and closed loop control device 18 of the rotational speed control structure shown in FIG. 2 comprises two essential control circuits. The differential rotational speed of the second shifting element 30 is controlled via the first control circuit with a target turbine torque m_t_soll, which constitutes a correcting variable, which is factored in, wherein the target power transmission capacity m_WK_soll of the torque converter lockup clutch 8B can also be used for this purpose. The rotational speed of the electric motor 3 is controlled via the additional control circuit for the purpose of determining the control portion of the target drive torque m_3_soll of the electric motor 3, which likewise constitutes a correcting variable.

In function block 24, the target rotational speed n_3_soll of the electric motor, which corresponds to the pump rotational speed of the torque converter 8A and is required for realizing the requested target output torque m_fahr_soll, is ascertained via the inverse converter engine characteristics and the actual turbine rotational speed n_t_ist. The pump torque m_p simultaneously calculated in the function block 24 is provided for the predefined values of the control of the electric motor 3. If the actual transmission input rotational speed n_GE_ist and the target slippage specification s_30_soll of the second shifting element 30 are used as input variables for the function block 24 instead of the measured actual turbine rotational speed n_t_ist, the feedback in the control circuit caused by the use of measurement variables is decreased and a better overall stability of the control is achieved.

The control of the rotational speed n_3 of the electric motor 3 is performed in the area of the electric motor 3, where the target drive rotational speed n_3_soll of the electric motor represents the target variable of the control. The target drive torque m_3_soll of the electric motor represents a correcting variable of the control, where the pump torque m_p determined via the function block 24 and the target power transmission capacity m_7_soll of the first shifting element represent disturbance variables in the control of the rotational speed n_3 of the electric motor 3.

The third control device 28 is furthermore provided to facilitate incorporating the target power transmission capacity m_WK_soll of the torque converter lockup clutch 8B as an additional correcting variable in order to control the slippage of the second shifting element 30 via the hydrodynamic turbine torque m_t of the hydrodynamic torque converter 8A as correcting variable. The mode of operation makes possible the parallel hybrid powertrain 1 to be operated with shorter open loop and closed loop control times, owing to the greater correcting dynamics of the torque converter lockup clutch 8B in comparison with the hydrodynamic torque converter 8A, the turbine torque m_t, whose turbine torque m_t changes only after a change in the rotational speed n_3 of the electric motor 3.

When the torque converter lockup clutch 8B is fully released, essentially no torque can be guided through it. When the torque converter lockup clutch 8B is in this operating state, essentially only one exertion of influence in one direction exists via the third control device 28, because the power transmission capacity of the torque converter lockup clutch 8B can essentially be only increased but not decreased. In order to be able to set the power transmission capacity of the torque converter lockup clutch 8B in both directions within the area of the torque converter lockup clutch 8B via the third control device 28, it is essential to keep the torque converter lockup clutch 8B in a state of operation in which the torque converter lockup clutch 8B offers a power transmission capacity to which a so-called basic torque can be guided via the torque converter lockup clutch 8B.

In this type of approach, the load capacity of the torque converter lockup clutch 8B must be taken into consideration to avoid overstressing. For this purpose, it can be provided, for example, that the power transmission capacity of the torque converter lockup clutch 8B, following a dynamic control intervention by means of the third control device 28, is slowly guided back to the level of the power transmission capacity of the torque converter lockup clutch 8B, where the basic torque can be guided via the torque converter lockup clutch 8B and where the load on the torque converter lockup clutch 8B, operated in a slip mode, is minor.

The coordination between the control devices 22 and 25 as well as the third control device 28 is preferably designed in such a way that highly dynamic control interventions are executed by means of the third control device 28, while the stationary control accuracy is adjusted within the area of the first control device 22 and the second control device 25.

If the torque converter lockup clutch 8B is realized with a power transmission capacity corresponding to the basic torque, this basic torque should be taken into consideration for the predefined variables of the control of the rotational speed n_3 of the electric motor in a manner, which is not described in further detail.

Figure 5:
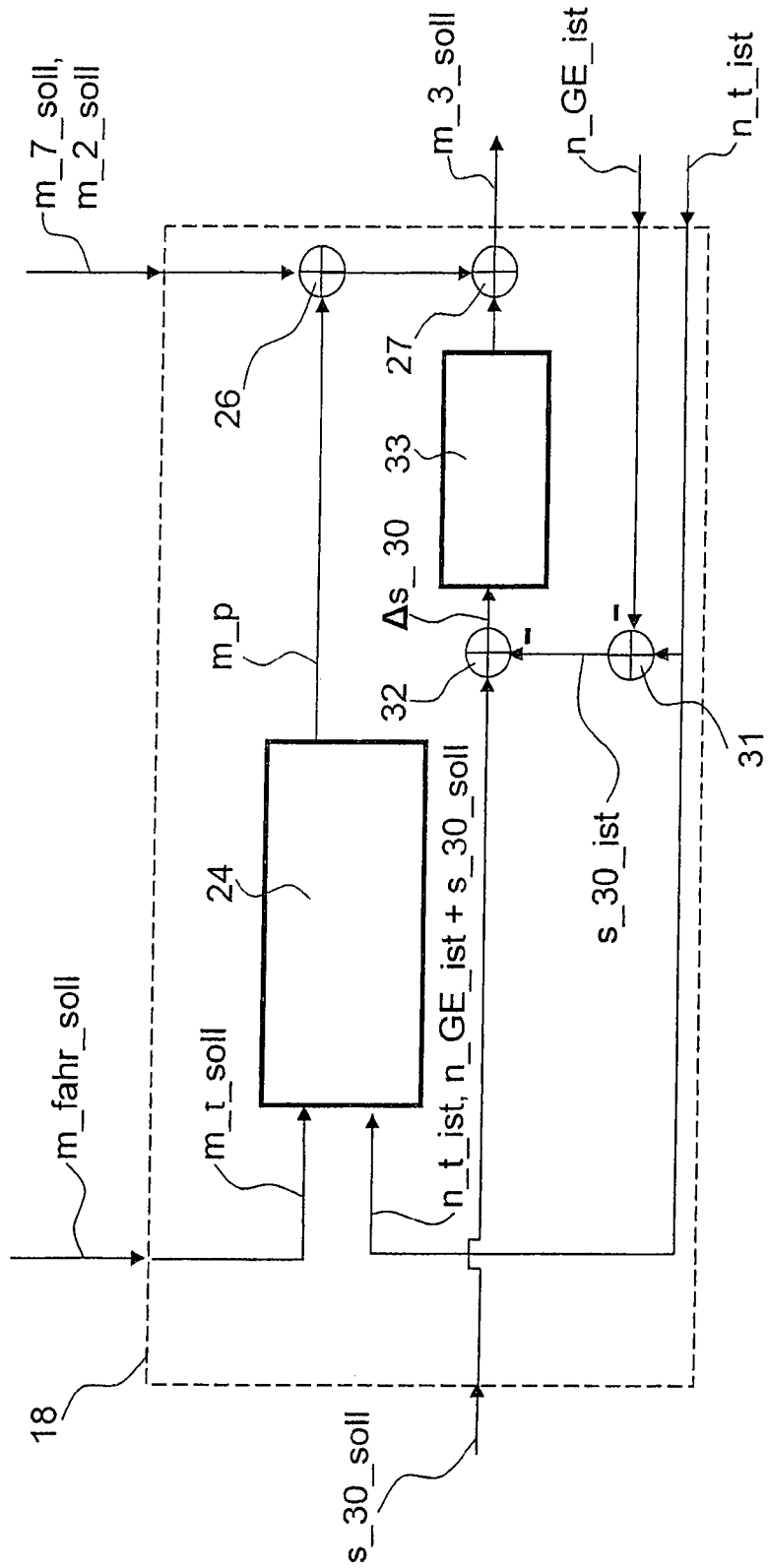
FIG. 5 a second embodiment of the open loop and closed loop control device of the torque control structure shown in FIG. 2.

FIG. 5 illustrates a second embodiment of the open loop and closed loop control device 18 illustrated in FIG. 2, which, in contrast with the first embodiment of the open loop and closed loop control device 18 illustrated in FIG. 4, is designed with only one control circuit. In the open loop and closed loop control device 18 illustrated in FIG. 5, the target drive torque m_fahr_soll requested by the driver, the target slippage specification s_30_soll of the second shifting element 30, the target power transmission capacity m_7_soll of the first shifting element 7, the measured actual transmission input rotational speed n_GE_ist, and the likewise measured actual turbine rotational speed n_t_ist are fed as input variables in the same manner as in the open loop and closed loop control device 18 illustrated in FIG. 4, while the target drive torque m_3_soll of the electric motor 3 represents the output variable of the open loop and closed loop control device 18 as the correcting variable of the real process 19.

The target-output torque m_fahr_soll and the actual-turbine rotational speed n_t_ist or the rotational speed variable calculated from the sum of the actual-transmission input rotational speed n_GE_ist and the target slippage n_30_soll of the second shifting element 30 and equivalent thereto are fed to the function block 24 as input variables. The output variable of the function block 24 represents the theoretically ascertained pump torque m_p, which is added to the target power transmission capacity m_7_soll of the first shifting element 7 representing a disturbing moment in the same manner as in the open loop and closed loop control device 18 illustrated in FIG. 4. The sum of the pump torque m_p and the target-power transmission capacity m_7_soll of the first shifting element 7 represent a control portion of the target drive torque m_3_soll of the electric motor 3.

In a sixth crosspoint 31, the actual slippage n_30_ist of the second shifting element 30 is calculated from the difference between the actual turbine rotational speed n_t_ist, which corresponds to the output torque of the start-up element 8 or the input rotational speed of the second shifting element 30, and the actual transmission input rotational speed n_GE_ist, which corresponds to the output rotational speed of the second shifting element 30, and a control deviation between the target slippage specification s_30_soll and the actual slippage s_30_ist of the second shifting element 30 is ascertained, and is then fed as an input value to a fourth control device 33.

Via the fourth control device 33, a control portion of the target drive torque m_3_soll of the electric motor 3 is determined, and is then added to the control portion or to the sum of the pump torque m_p and the target power transmission capacity m_7_soll of the first shifting element 7, in the fifth crosspoint 27.

In the open loop and closed loop control device 18 illustrated in FIG. 5, the differential rotational speed or the slippage s_30 of the second shifting element 30 is controlled directly via the electric motor, while the predefined values of the electric motor 3 rotational speed control are provided by means of pump torque m_p ascertained in function block 24 and via the target power transmission capacity m_7_soll of the first shifting element 7.

Figure 6:
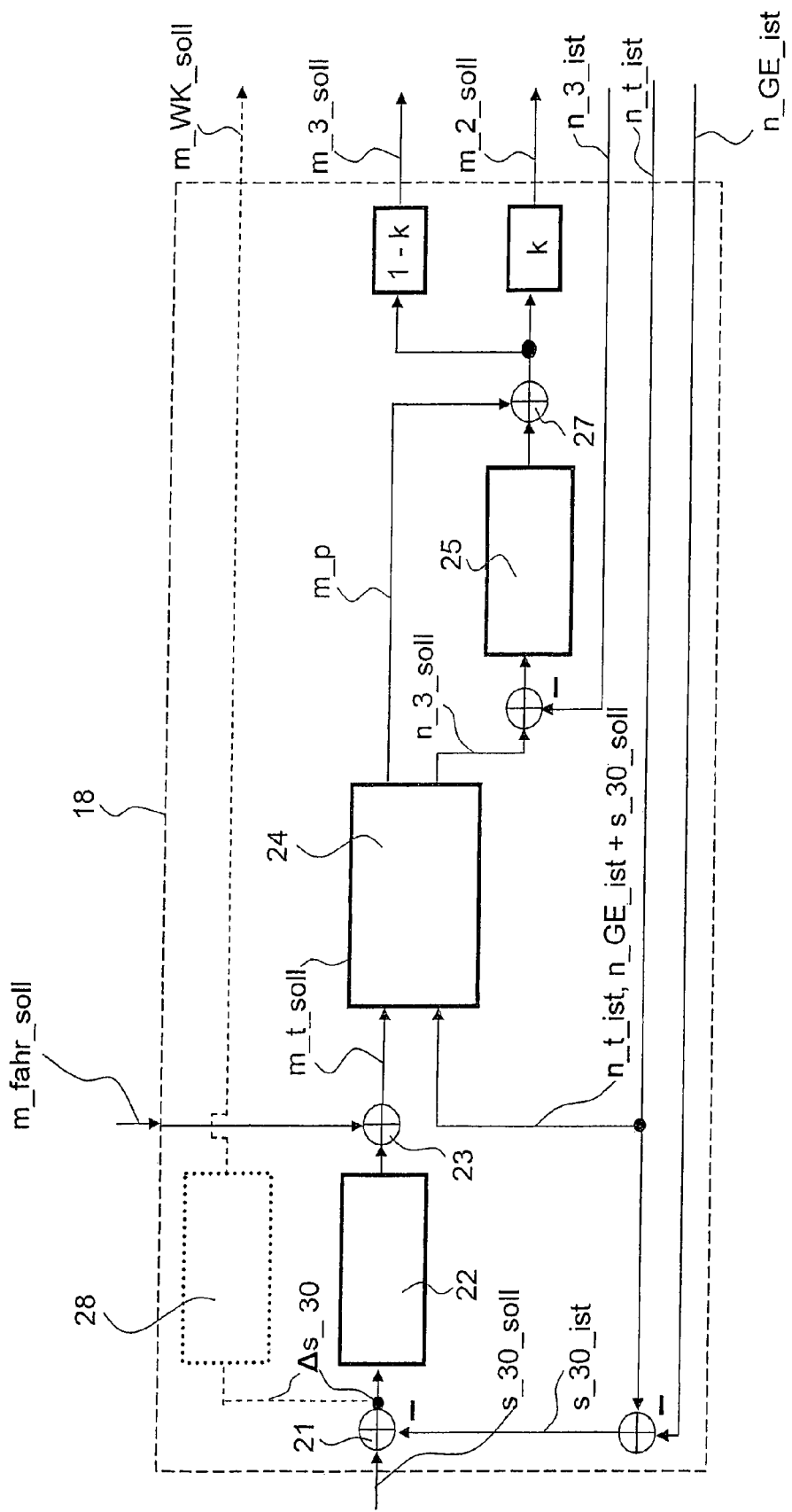
FIG. 6 a detailed block diagram of an open loop and closed loop control device of the torque control structure shown in FIG. 3.

FIG. 6 is a detailed block diagram illustrating a first embodiment of the open loop and closed loop control device 18 of the rotational speed control structure illustrated in FIG. 3, where this embodiment differs from the first embodiment of the open loop and closed loop control device 18 of the rotational speed control structure illustrated in FIG. 2, essentially in the area of predefined values after the function block 24 and in the area of control of the target drive torque generated by the electric motor 3 and the internal combustion engine 2 during hybrid driving operation after the fifth crosspoint 27. For this reason, the following description focuses only on the differences and, with regard to the further functionality of the open loop and closed loop control device 18 illustrated in FIG. 6, it refers to the existing description for FIG. 4.

Because the open loop and closed loop control device 18 illustrated in FIG. 6 for operating the parallel hybrid powertrain 1 is envisioned in an operating state 1, in which the internal combustion engine 2 is activated and the first shifting element 7 is fully engaged, the power transmission capacity m_7 of the first shifting element 7, that is, the target drive torque m_3_soll of the electric motor 3 and the target drive torque m_2_soll of the internal combustion engine 2, is not factored in when ascertaining the correcting variable. This means that the control portion of the target drive torque that can be generated henceforth via both the internal combustion engine 2 and the electric motor 3 when the internal combustion engine 2 is activated corresponds to the pump torque m_p calculated via the function block 24 and is added to the control portion of the target drive torque of the drive units 2 and 3, ascertained in the second control device 25.

The sum of the control specification of the target-drive torque m_3 of the electric motor 3 and the control portion of the target-drive torque m_3 of the electric motor 3 represent in principle the total target drive torque to be generated by the drive units, that is, the electric motor and/or the internal combustion engine 2 of the parallel hybrid powertrain 1, as illustrated in FIG. 1, and which is required for realizing the target drive torque m_fahr_soll to be applied at the output 5.

In principle, it is possible to raise the target drive torque m_3_soll of the electric motor 3 from the internal combustion engine 2 during the corresponding operating state of the parallel hybrid powertrain 1, that is, during a normal driving operation of the parallel hybrid powertrain 1, while no drive torque is outputted by the electric motor 3. Furthermore, it is also possible to operate the electric motor 3 for the purpose of charging the electric accumulator 13 and to guide a torque that counteracts the drive-torque of the internal combustion engine 2 into the parallel hybrid powertrain 1.

Because the target output torque m_fahr_soll requested by the driver is made available in various operating situations of the parallel hybrid powertrain 1 either from one of the drive units 2 and 3 alone or from both of the drive units 2 and 3 together, a superior driving strategy module is provided, by means of which either one of the drive units or both of the drive units are selected, by which the target drive torque is to be generated. The portions of the ascertained target drive torque to be generated by the electric motor 3 and/or the internal combustion engine 2 are ascertained using the driving strategy module, preferably following the addition of the open loop control portion and the closed loop control portion of the target drive torque of the electric motor, that is, after the fourth crosspoint 27.

For this purpose, a distribution ratio k is ascertained from the driving strategy module, which corresponds to the ratio of the portion of the target drive torque to be generated by the electric motor 3 to the portion of the target drive torque to be generated by the internal combustion engine 2. The sum representing the total target drive torque and computed in the fifth crosspoint 27 from the open loop control portion and the closed loop control portion is then multiplied either by the factor k or by the factor 1−k, where the products represent the respective target drive torques m_2_soll, m_3_soll to be generated by the individual drive units 2, 3.

Figure 7:
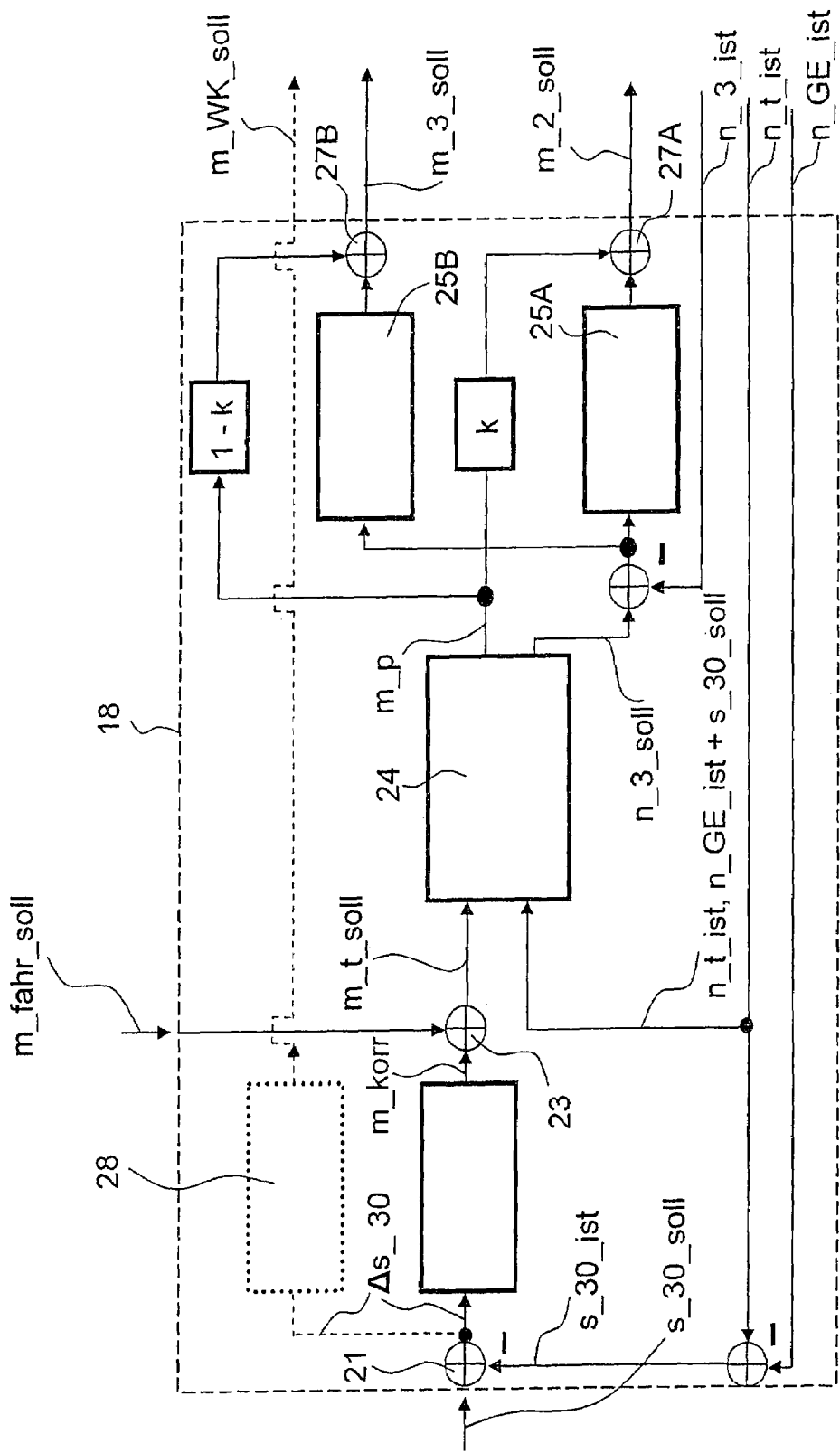
FIG. 7 a second embodiment of the open loop and closed loop control device of the torque control structure shown in FIG. 3.

FIG. 7 shows a second embodiment of the open loop and closed loop control device 18 of the rotational speed control structure illustrated in FIG. 3. Here, the pump torque m_p, which represents the control specification of the target drive torque of the drive units 2 and 3 determined in function block 24, is divided prior to being added to a corresponding control portion of the target drive torque of the drive units 2 and 3 according to the distribution ratio k determined by means of the driving strategy module. The target drive rotational speed n_3_soll of the electric motor 3 determined through the function block 24, which corresponds to the target drive rotational speed of the internal combustion engine 2 when the shifting element 7 is engaged, is used as in the open loop and closed loop control device 18 illustrated in FIG. 6 for determining a control deviation from the actual rotational speed n_3_ist of the electric motor 3, which corresponds to the respective pump rotational speed of the torque converter 8A or the input rotational speed of the starting element 8 of the parallel hybrid powertrain 1.

The ascertained control deviation is then fed to both a closed loop control device 25A and a closed loop control device 25B. The closed loop control device 25A ascertains the closed loop control portion of the target drive torque portion of the drive units 2 and 3 of the parallel hybrid powertrain 1 to be generated by the internal combustion machine, which is then added in a crosspoint 27A to the portion of the control specification for the target-drive torque of the drive units 2, 3 of the parallel hybrid powertrain 1 ascertained through the driving strategy module, where the sum represents the portion m_2_soll of the target drive torque, which is to be produced by the internal combustion engine 2.

Furthermore, the closed loop control deviation between the target drive rotational speed n_3_soll and the actual rotational speed n_3_ist of the electric motor 3 ascertained in the function block 24 is fed as input variable to the closed loop control device 25B, where the control portion of the portion m_3_soll to be generated by the electric motor 3 of the total target drive torque to be generated by the two drive units 2 and 3 of the parallel hybrid powertrain 1 is ascertained through the last mentioned closed loop control device 25B. In crosspoint 27B, the closed loop control portion ascertained through the closed control device 25B is added to the open loop control portion ascertained through the driving strategy module, where the sum of the closed loop control portion of the closed loop control device 25B and the open loop control portion represents the portion m_3_soll of the total target drive torque to be generated by the electric motor 3.

In both the open loop and closed loop control device 18 illustrated in FIG. 6 and the open loop and closed loop control device 18 illustrated in FIG. 7, it is possible to completely disengage the torque converter lockup clutch 8B, so that the target drive torque, generated by the electric motor 3 and/or by the internal combustion engine 2, is conducted completely via the hydrodynamic torque converter 8A in the direction of the output 5. This means that the rotational speed control structure illustrated in FIG. 3 is also suited for operating a parallel hybrid powertrain 1, whose starting element 8 is configured without torque converter lockup clutch.

By means of a suitable control of the torque converter lockup clutch 8B, it is possible to easily decrease the influence of the converter characteristic value during the operation of the parallel hybrid powertrain 1, as a function of the currently power transmission capacity of the torque converter lockup clutch or to eliminate it altogether when the torque converter lockup clutch is fully engaged.

In order to facilitate the operation of the parallel hybrid powertrain 1 illustrated in FIG. 1, also in operating states with a high degree of driving comfort, during which the torque converter lockup clutch 8B is available with power transfer capacities in which the target drive torque generated by the electric motor 3 and/or the internal combustion engine 2 is also at least partially guided via the torque converter lockup clutch 8B, the target power transmission capacity m_WK_soll of the torque converter lockup clutch 8B is adjusted by means of the third control device 28 in the manner illustrated in FIG. 4 and described in further detail.

In contrast with the open loop and closed loop control device 18, illustrated in FIG. 6, the embodiment of the open loop and closed loop control device 18, illustrated in FIG. 7, offers the possibility of variably coordinating the closed loop control units 25A and 25B for the electric motor 3 and the internal combustion engine 2. For example, through the appropriate division of the pump torque m_p, the realization of the required target output torque m_fahr_soll and the dynamic control of the slippage s_30 of the second shifting element 30 can be specifically subordinated to the drive units 2 and 3 of the parallel hybrid powertrain 1. A particular specification is then present, if the closed loop control device 25A connected to the internal combustion engine 2 is set to zero, so that no control portion is outputted by the control device 25 and the internal combustion engine is operated in a purely controlled manner by a precontrolling factor k=1.

In this way, the internal combustion engine 2 alone provides in principle the target output torque m_fahr_soll required at the output. In this type of operating state, the electric motor 3 is assigned only the task of correcting deviations in the slippage of the second shifting element 30 from the target slippage specification s_30_soll. Furthermore, the electric motor 3 can be operated both in a motoring operation, in which the electric motor 3 generates a positive drive torque, and in a generating operation, in which the electric motor generates a negative drive torque in relation to the target drive torque of the drive units.

Figure 8:
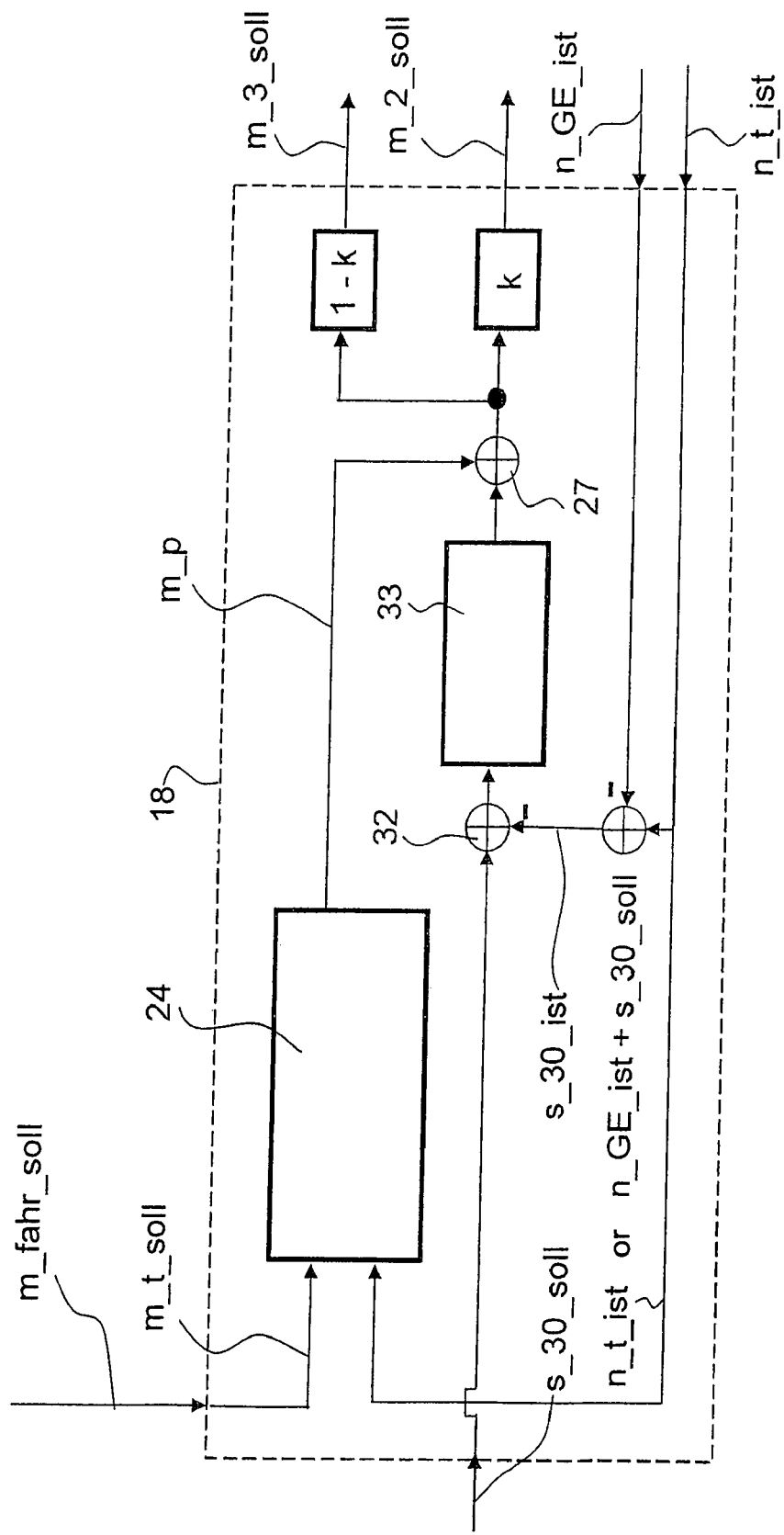
FIG. 8 a third embodiment of the open loop and closed loop control device of the torque control structure shown in FIG. 3.

A third embodiment of the open loop and closed loop control device 18 of the rotational speed control structure illustrated in FIG. 3 is presented in FIG. 8, where the open loop and closed loop control device 18 in principle corresponds to the embodiment of the open loop and closed loop control device 18 illustrated in FIG. 5 without the target power transmission capacity m_7_soll of the first shifting element 7 being factored in. Furthermore, in a further difference with respect to the open loop and closed loop control device 18 illustrated in FIG. 5, the open loop and closed loop control device 18 illustrated in FIG. 8 is expanded after the fifth crosspoint 27 by the division, explained in further detail in the description of FIG. 6, of the target drive torque of the drive units 2 and 3, calculated in crosspoint 27, between the electric motor 3 and the internal combustion engine 2.

Figure 9:
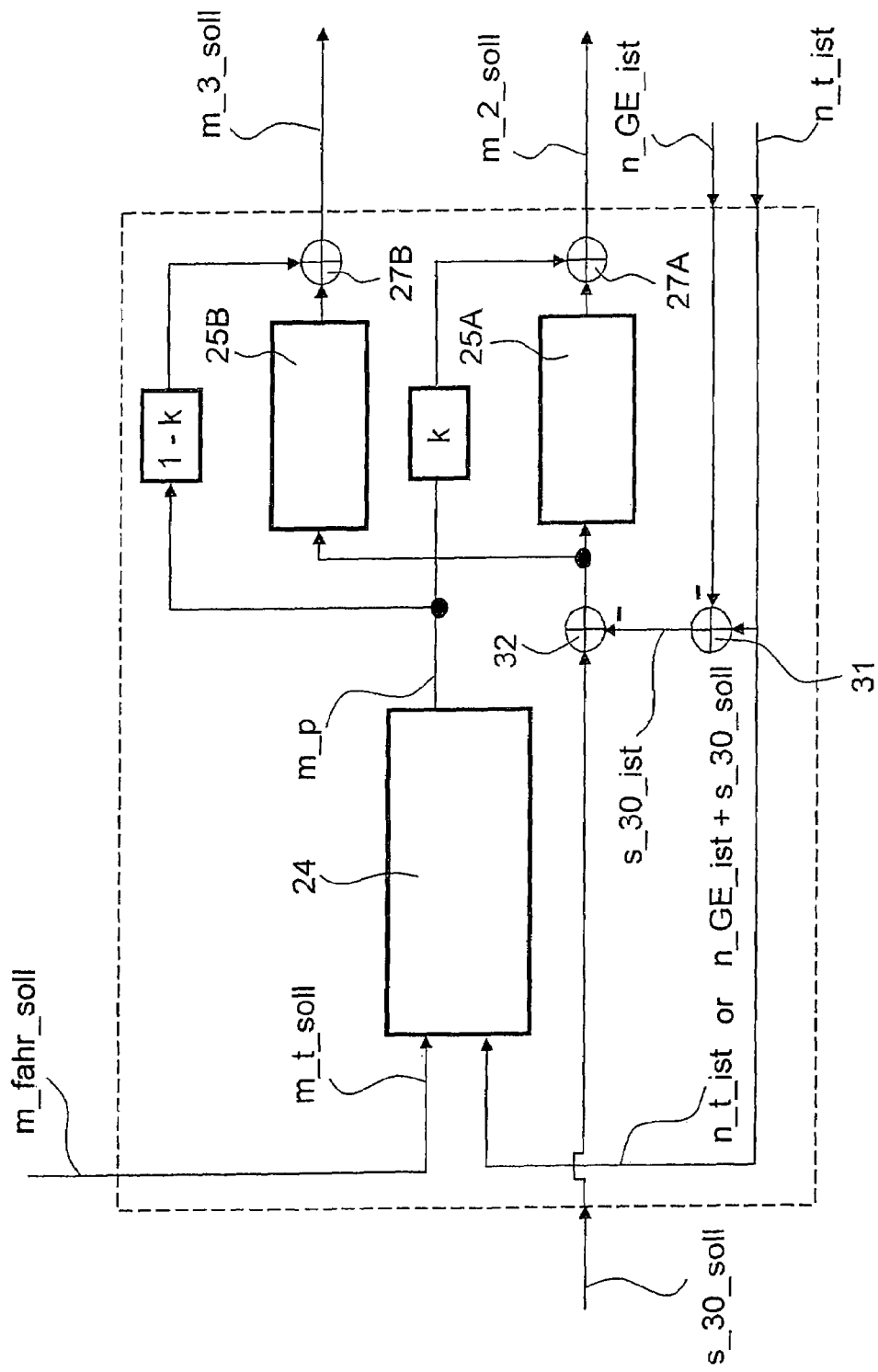
FIG. 9 a fourth embodiment of the open loop and closed loop control device of the torque control structure shown in FIG. 3.

As illustrated in FIG. 9, the fourth embodiment of the open loop and closed loop control device 18a of the rotational speed control structure described in FIG. 3 is also based on the open loop and closed loop control device 18 presented in FIG. 5, where the target drive torque to be generated by the drive units 2 and 3 of the parallel hybrid powertrain 1 illustrated in FIG. 1 is divided between the electric motor 3 and the internal combustion engine 2 in a similar manner as found in the open loop and closed loop control device 18 illustrated in FIG. 7.

A simplified variation of the inventive method differs from the approach described above in the fact that the division factor k is not ascertained via the superior driving module as a function of the current operating state of the parallel hybrid powertrain 1, but instead represents a fixed value that is determined once during vehicle setup and is stored in a control device attached to the parallel hybrid powertrain.

In principle, the drive torque of the internal combustion engine 2 that can be applied at the starting element 8 during a hybrid driving operation can, along with a corresponding engine control, be varied by means of a corresponding adjustment of the power transmission capacity of the shifting element 7, so that in parallel hybrid powertrain operating situations posing difficulties for engine control fluctuations in the internal combustion engine 7, the torque can be easily corrected within the range of a slippingly operated first shifting element 7.

In principle, the power transmission capacity m_7 of the first shifting element 7 or the torque m_7 that can be guided through the shifting element 7 represents a control variable of the rotational speed control structure illustrated in FIG. 2 during the startup of an internal combustion engine 2 in order to enable the internal combustion engine 2 to be coupled to the electric motor 3 and to be started without any type of reaction torque at the output when there is a request for an activation of the internal combustion engine 2.

After the internal combustion engine 2 is started, the switch 29 in the rotational speed control structure illustrated in FIG. 2 is thrown and the target drive torque m_2_soll to be generated by the internal combustion engine 2 is fed as control variable to the real process 19 to be controlled.

Thus the target drive torque m_3_soll to be generated by the electric motor 3 during a vehicle starting procedure facilitated solely by the electric motor 3 or during an internal combustion engine 2 starting procedure facilitated by the electric motor 3, which is determined as a function of the load torques occurring in the parallel hybrid powertrain 1, which constitute disturbance variables of the control.

Increasing the power transmission capacity of the shifting element 7 brings the internal combustion engine 2 into increased functional connection with the electric motor 3, where with increasing power transmission capacity of the shifting element 7, the rotatable masses of the still disengaged internal combustion engine 2 exist in opposition to the drive torque of the electric motor 3 as a disturbing moment. This means that the disturbing moment appearing as a result of the shifting element 7 being engaged is initially high due to overcoming the high engine friction and compression torque before basically dropping once the internal combustion engine 2 is started.

During the start procedure, the engine control unit 17 provides the internal combustion engine 2 with a starting torque as target variable in the form of a target load position or a target rotational speed, for example the actual rotational speed of the electric motor 3, in order to transfer the shifting element by simple means and within short processing times into a synchronous state. However, once the internal combustion engine 2 is connected via the shifting element 7, the second shifting element 7 can be engaged before the load can then be transferred from the electric motor 3 to the internal combustion engine, where the engagement of the shifting element 7 and the load transfer can occur simultaneously.

The increasing disturbing moment in the control of the target drive torque_3_soll of the electric motor 3 resulting from the increase of the power transmission capacity of the shifting element 7 can, under certain circumstances, be decreased in a time-controlled manner for the purpose of reducing the stress of the electric motor 3 by reducing the power transmission capacity of the shifting element 7, where the power transmission capacity m_7 of the shifting element 7 can, in contrast to what was previously described, be continuously increased to a value at which the first shifting element 8 is fully engaged, without lowering the power transmission capacity in the meantime.

In principle, the inventive method provides the possibility of ascertaining, by simple means, the pump uptake torque and the related pump rotational speed of a torque converter 8A as a function of a target output torque requested by the driver, which is equivalent to an input rotational speed of the second shifting element, and a measured output torque or an equivalent actual turbine rotational speed of the torque converter through a known converter behavior. The pump uptake torque as well as the pump rotational speed of the torque converter can be ascertained assuming a quasi stationary operation of the hydrodynamic torque converter. The conditional equation for a typical TriLok converter and the related monotone characteristic curves lead to an implicit system of equations that definitively solve the sought variables. Interactive methods, such as the Newton method or also offline-computations that store the results in the form of engine characteristics can be utilized to solve these equations.

In the event that the influence of converter recognition should be reduced through the use of a torque converter lockup clutch, the inventive method can be expanded through simple means by dividing the target transmission input torque equivalent to the target output torque requested by the driver between the torque converter lockup clutch and the hydrodynamic torque converter by means of a torque division factor. The target transmission input torque reduced by a factor of the torque routed through the torque converter lockup clutch is then fed as target turbine torque to the mechanism ascertaining the target variable of the pump uptake torque of the torque converter. The target output torque to be generated by the electric motor and/or the internal combustion engine can then be ascertained by adding up the ascertained pump uptake torque of the torque converter and the torque portion to be routed through the torque converter lockup clutch.

The torque division factor between the torque converter and the torque converter lockup clutch can be ascertained, for example, as a function of the output torque of the output side of the parallel hybrid powertrain and the driver input with regard to target output torque and can be stored as operating state dependant characteristic value in engine characteristics or the like in a control device of the parallel hybrid powertrain of a motor vehicle or can be determined on the spot in the operation of a parallel hybrid powertrain through an appropriate calculation algorithm.

In principle, the second shifting element 30 of the parallel hybrid powertrain is held in a slippage operation during a startup involving only the electric motor, during an internal combustion engine start powered by the electric motor, as well as during a hybrid operation, in which the vehicle is powered by both the internal combustion engine 2 and the electric motor 3, for the purpose of dampening the fluctuations in torque appearing in relation to the second shifting element 30 in the internal combustion engine portion of the parallel hybrid powertrain and generating no reaction torque at the output side that would detract from driving comfort.

In principle, the coupling element arranged between the electric motor and the output is configured with rotational speed recognition. This means that the torque conducted via the coupling element is varied as a function of differential rotational speed at the coupling element. In all of the described embodiments of the parallel hybrid powertrain according to the invention, the coupling element can be designed as hydrodynamic torque converter, hydrodynamic clutch, for example, as Foettinger clutch, as centrifugal clutch or the like.

REFERENCE CHARACTERS

1 Parallel hybrid powertrain
2 Internal combustion engine
3 Electric motor
4 Transmission
4A Transmission input shaft
5 Output
6 Device for reducing rotational irregularities
7 Second shifting element
8 First shifting element
8A Torque converter
8B Torque converter lockup clutch
9 Axle differential
10 Wheels
11 Brake system
12 Brake booster
13 Electric accumulator
14 Electric control device
15 Vehicle electrical system
16 Electric transmission control device
17 Engine control device
18 Open loop and closed loop control device
19 Real process
20 First crosspoint
21 Second crosspoint
22 First closed loop control device
23 Third crosspoint
24 Function block
25 Second closed loop control device
25A Closed loop control device
25B Closed loop control device
26 Fourth crosspoint
27 Fifth crosspoint
28 Third closed loop control device
29 Switch
30 Second shifting element
31 Sixth crosspoint
32 Seventh crosspoint
33 Fourth closed loop control device
$M\_2$ Drive torque of the internal combustion engine
$M\_2\_soll$ Target drive torque of the internal combustion engine
$M\_3$ Drive torque of the electric motor
$M\_3\_soll$ Target drive torque of the electric motor
$M\_7$ Power transmission capacity of the shifting element
$m\_7\_soll$ Target power transmission capacity of the first shifting element
$m\_fahr\_soll$ Target output torque
$m\_korr$ Correction torque of the target output torque
$m\_p$ Pump torque
$m\_t$ Turbine torque
$m\_t\_soll$ Target turbine torque
$m\_WK$ Transmission capacity of the torque converter lockup clutch
$m\_WK\_soll$ Target transmission capacity of the torque converter lockup clutch
$n\_2$ Rotational speed of the internal combustion engine
$n\_3$ Rotational speed of the electric motor
$n\_3\_ist$ Actual rotational speed of the electric motor
$n\_3\_soll$ Target drive rotational speed of the electric motor
$n\_GE\_ist$ Actual transmission input rotational speed
$n\_t$ Rotational speed of the turbine
$n\_t\_ist$ Actual turbine rotational speed
$S\_30\_ist$ Actual slippage of the second shifting element
$s\_30\_soll$ Target slippage specification of the second shifting element
$\Delta s\_30$ Control deviation of the slippage of the second shifting element

The invention claimed is:
1. A method of operating a parallel hybrid powertrain (1) of a motor vehicle (19) in which the parallel hybrid powertrain (1) comprises a single output (5), plurality of multiple drive units (2, 3) comprising at least one internal combustion engine (2) and at least one electric motor (3), the at least one electric motor (3) being located in the parallel hybrid powertrain (1), between the single output (5) and the at least one internal combustion engine (2), a first friction-locking shifting element (7) being located between the internal combustion engine (2) and the electric motor (3), and a coupling element (8A), having a rotational speed dependent known value, and at least a second friction-locking shifting element (30) being located between the electric motor (3) and the single output (5), a target-output torque (m_fahr_soll), which propels the output (5), depends on a power transmission capacity of the second shifting element (30), the method comprising the steps of:

allowing the power transmission capacity of the second shifting element (30) to depend on the required target output torque (m_fahr_soll);

controlling the power transmission capacity of the second shifting element (30) such that the second shifting element (30) has the power transmission capacity required to achieve the target output torque (m_fahr_soll) at the output (5);

controlling a target drive torque (m_2_soll, m_3_soll), produced by the plurality of drive units (2, 3), by a target slippage parameter (s_30_soll) of the second shifting element (30), which depends on the target output torque (m_fahr_soll); and controllably regulating the target slippage parameter (s_30_soll) of the second shifting element (30) depending on a further operating state parameter (s_30) of the parallel hybrid powertrain (1).

2. The method of claim 1, further comprising the step of allowing slippage (s_30) of the second shifting element (30) to represent an operating state parameter of the parallel hybrid powertrain (1) and adjusting the slippage (s_30) as a function of an actual rotational speed (n_GE_ist) of an output-side clutch half of the second shifting element (30) and an actual slippage (s_30_ist) of the second shifting element (30).

3. The method of claim 2, further comprising the step of adjusting the slippage (s_30) of the second shifting element (30) depending on one of an actual turbine rotational speed (n_t_ist) of the first coupling element (8A) and a sum of the actual transmission input rotational speed (n_GE_ist) and the target slippage parameter (s_30_soll) of the second shifting element (30), the first coupling element (8A) being a hydrodynamic torque converter.

4. The method of claim 1, further comprising the step of adjusting the slippage (s_30) of the second shifting element (30) depending on an actual rotational speed (n_3_ist) of the electric motor (3).

5. The method of claim 2, further comprising the step of additionally adjusting the slippage (s_30) of the second shifting element (30) further depending on control variables (m_7_soll, m_2_soll) of the parallel hybrid powertrain (1), which represent disturbance variables in the control of the slippage (s_30) of the second shifting element (30).

6. The method of claim 1, further comprising the step of switching the second shifting element (30) into a slippage operation when one of the power transmission capacity of the second shifting element (30) is changed and a rotational speed (n_3) of the electric motor (3) is changed, while the target output torque (m_fahr_soll) is present at the output (5).

7. The method of claim 4, further comprising the step of ascertaining a control deviation (Δs_30) between the target slippage parameter (s_30_soll) and the actual slippage (s_30_ist) of the second shifting element (30).

8. The method of claim 7, further comprising the step of providing the control deviation (Δs_30) between the target slippage parameter (s_30_soll) and the actual slippage (s_30_ist) of the second shifting element (30) to a first closed loop control device (22) for ascertaining a correction torque (m_korr) of the target output drive (m_fahr_soll).

9. The method of claim 8, further comprising the step of determining a corrected target output torque by adding the correction torque (m_korr) of the target output torque (m_fahr_soll) to the target output torque (m_fahr_soll).

10. The method of claim 7, further comprising the step of providing the closed loop control deviation (Δs_30) between the target slippage parameter (s_30_soll) and the actual slippage (s_30_ist) of the second shifting element (30) to a closed loop control device (25; 25A; 25B) for ascertaining a closed loop controlled portion of the target drive torque (m_2_soll, m_3_soll).

11. The method of claim 1, further comprising the step of ascertaining the target drive torque (m_2_soll, m_3_soll) produced by at least one of the drive units (2, 3) as a function of an inverse converter recognition of the coupling element (8A).

12. The method of claim 11, further comprising the step of ascertaining one of a target drive rotational speed (n_3_soll) of the electric motor (3) and an equivalent rotational speed variable of the parallel hybrid powertrain (1), via the inverse converter recognition as a function of the target output torque (m_fahr_soll), which is employed to calculate one of a control deviation between an actual rotational speed (n_3_ist) of the electric motor (3) and the target drive rotational speed (n_3_soll) of the electric motor (3) and a control deviation between a rotational speed variable of the parallel hybrid powertrain (1) equal to the actual rotational speed (n_3_ist) of the electric motor (3) and a rotational speed variable of the parallel hybrid powertrain (1) equal to the target drive rotational speed (n_3_soll) of the electric motor (3), for determining the target drive torque (m_2_soll, m_3_soll).

13. The method of claim 12, further comprising the step of providing one of the control deviation between the actual rotational speed (n_3_ist) of the electric motor (3) and the target drive rotational speed (n_3_soll) of the electric motor (3) and the control deviation between the rotational speed variable of the parallel hybrid powertrain (1), equal to the actual rotational speed (n_3_ist) of the electric motor (3), and the rotational speed variable of the parallel hybrid powertrain (1), equal to the target drive rotational speed (n_3_soll) of the electric motor (3), to a closed loop control device (25; 25A, 25B) as an input value, whose output value represents a closed loop controlled portion of the target drive torque (m_2_soll, m_2_soll).

14. The method claim 11, further comprising the step of ascertaining one of a pump torque (m_p) of the torque converter (8A) and an equivalent torque via the inverse converter recognition as a function of one of the demanded target output torque (m_fahr_soll) and the corrected target-drive torque, which represents a control portion of the target-drive torque (m_2_soll, m_2_soll) to be determined and is added to the control portion of the target-drive torque (m_2_soll, m_2_soll) to be determined, in order to determine the target drive torque (m_2_soll, m_2_soll).

15. The method of claim 11, further comprising the step of selecting, via a driving strategy module, at least one of the drive units (2, 3) by which the target drive torque (m_2_soll, m_3_soll) is to be generated.

16. The method of claim 15, further comprising the step of ascertaining respective portions of the target drive torque (m_2_soll, m_3_soll) to be generated by the individual drive units (2, 3) following an addition of an open loop control portion and a closed loop control portion of the target drive torque (m_2_soll, m_3_soll) by means of the driving strategy module.

17. The method of claim 15, further comprising the step of ascertaining a control portion and a regulating portion of the portion of the target drive torque (m_2_soll, m_3_soll) for determining respective portions of the target drive torque (m_2_soll, m_3_soll) for each of the drive units (2, 3) to be generated by the drive units (2, 3), the sum of the open loop controlled portion of the portions of target drive torque (m_2_soll, m_3_soll) generated by the drive units (2, 3) corresponds to the pump torque (m_p) of the torque converter (8A), and the closed loop control portions of the portions of the target-drive torque (m_2_soll, m_3_soll) to be generated by the drive units (2, 3) are each determined by means of the closed loop control devices (25A, 25B) subordinate to the drive units (2, 3) as a function of the target drive rotational speed (n_3_soll) of the electric motor (3) ascertained via inverse converter recognition.

18. The method of claim 1, further comprising the step of generating the target drive torque (m_2_soll, m_3_soll) by the electric motor (3) when at least one of the first shifting element (7) is arranged between the electric motor (3) and the internal combustion engine (2) is available with power transmission, in which essentially no torque is guided via the shifting element (7), and when the internal combustion engine (2) is switched off, where the internal combustion engine (2) is connected to the parallel hybrid powertrain (1) through a change in the power transmission capacity of the first shifting element (7) when the internal combustion engine is requested to generate a drive torque.

19. The method of claim 1, further comprising the step of adjusting the power transmission capacity of the first shifting element (7) is adjusted to a value required for activating the internal combustion engine (2) when there is a request for the activation of the internal combustion engine (2), where the deactivated internal combustion engine (2) is increasingly driven by the electric motor (3) with the increasing power transmission of the first shifting element (7), and the resulting slippage torque (m_7), which also counteracts the drive torque (m_3) of the electric motor (3), represents a disturbance variable in the control of the rotational speed (n_3) of the electric motor (3).

20. The method of claim 1, further comprising the step of providing the control deviation (Δs_30) between the target slippage parameter (s_30_soll) and the actual slippage (s_30_ist) of the second slippage element (30) to a closed loop control device (28), by means of which a target load transferability (m_WK_soll) of a torque converter lockup clutch (8B) is determined, which is arranged in the parallel hybrid powertrain (1) parallel to the torque converter (8A), whose power transmission capacity can be continuously adjusted and can be bridged by means of the torque converter (8A).

* * * * *